No. 721,226. PATENTED FEB. 24, 1903.
P. H. T. PAULINETTI.
HEATING APPARATUS FOR BEDS OR COUCHES.
APPLICATION FILED APR. 26, 1902.
NO MODEL.
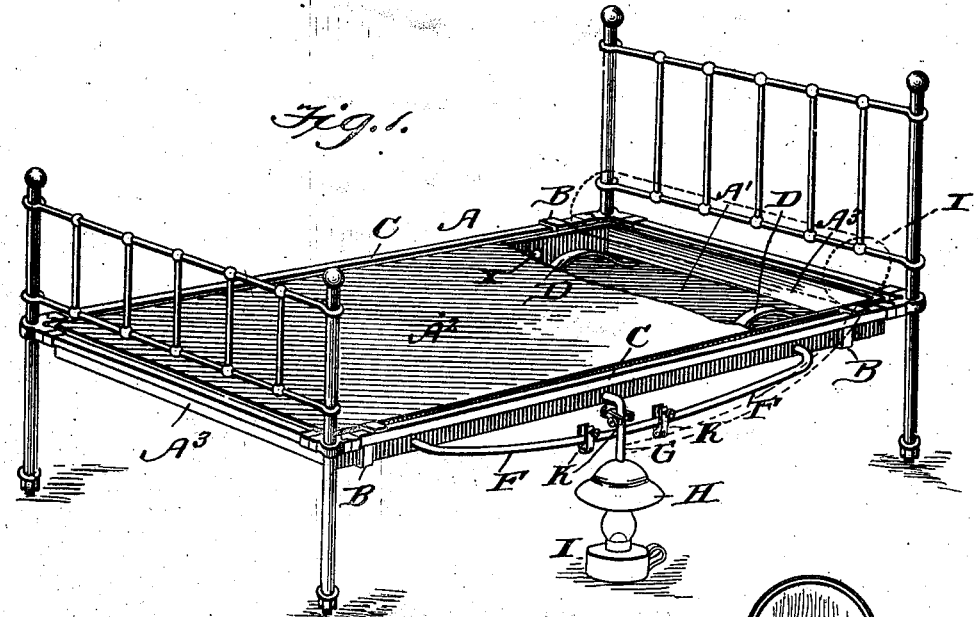
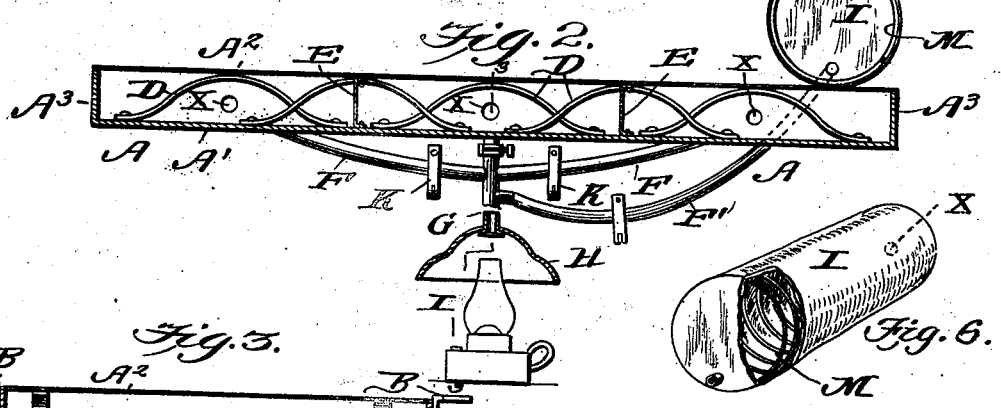
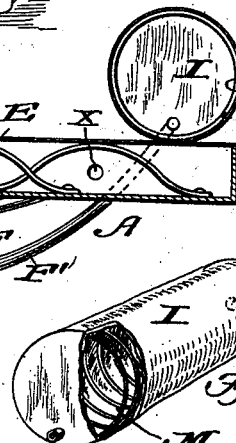
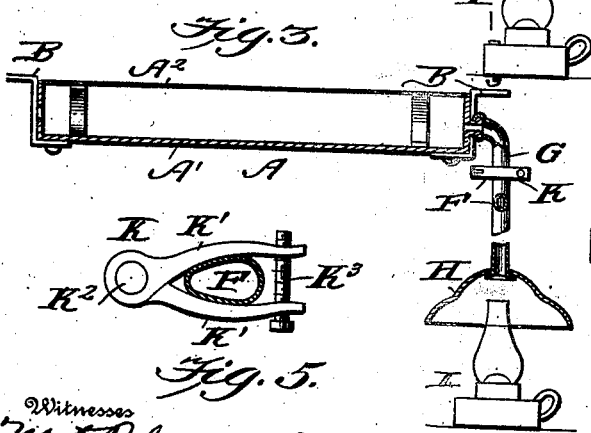
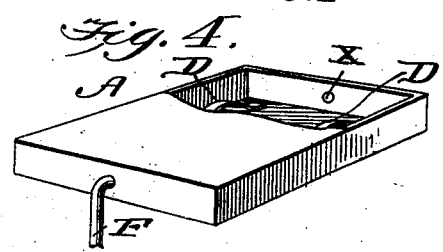
Witnesses
M. A. Blondel
Clarence Shaw
Inventor
P. H. T. Paulinetti.
By Richard H. Brock
Attorneys

UNITED STATES PATENT OFFICE.

PHILIP H. T. PAULINETTI, OF PHILADELPHIA, PENNSYLVANIA.

HEATING APPARATUS FOR BEDS OR COUCHES.

SPECIFICATION forming part of Letters Patent No. 721,226, dated February 24, 1903.

Application filed April 26, 1902. Serial No. 104,899. (No model.)

*To all whom it may concern:*

Be it known that I, PHILIP H. T. PAULINETTI, a citizen of the United States, and a resident of Philadelphia, in the county of Philadelphia and State of Pennsylvania, have invented a new and useful Heating Apparatus for Beds or Couches, of which the following is a specification.

This invention is a heating appliance to be used in connection with beds or couches for the purpose of applying heat to the entire body or any particular portion thereof, the object of the invention being to provide an exceedingly cheap and simple appliance which can be used in connection with any of the beds or couches now in common use and which will take the place of the ordinary mattress and springs.

With this object in view the invention consists, essentially, of a hollow body, preferably formed of air-tight fabric divided into two or more compartments, each compartment being provided with springs and also with means for supplying hot air thereto.

The invention consists also in certain details of construction and novelties of combination, all of which will be fully described hereinafter and pointed out in the claim.

In the drawings forming part of this specification, Figure 1 is a perspective view illustrating the practical application of my invention. Fig. 2 is a longitudinal sectional view, the heat-collecting funnel being also shown in section. Fig. 3 is a sectional view on the line 3 3 of Fig. 2. Fig. 4 is a sectional perspective view showing a cushion formed of a single section. Fig. 5 is a detail view illustrating the cut-off clamp, and Fig. 6 is a detail perspective of the pillow.

In carrying out my invention I employ a hollow body A, composed of the bottom A', top $A^2$, and the ends and sides $A^3$, all of said parts being preferably constructed of air-tight fabric, and such parts may be of any size and shape desired. The bottom A may be of stouter and stiffer material than the sides and top, although this is not absolutely essential. Angular supporting-arms are connected to the bottom of the body A, extend upwardly along the sides thereof, and project laterally at their upper ends for the purpose of engaging the side rails C of the bed, thereby supporting the hollow body A within the bed-frames and virtually constituting the mattress for the said bed. A series of leaf, spiral, or other form of springs D are arranged within the hollow body A, said springs being preferably connected to the bottom. These springs hold the top elevated and provide an elastic resting-surface for the patient. The hollow body A may be of such size as to entirely cover the bed, as shown in Fig. 1, or it may be a smaller section, as shown in Fig. 4. The construction shown in Figs. 1 and 2 is intended to apply the heat to the entire body, whereas the construction shown in Fig. 4 is intended to apply heat only to a certain portion of the body. I prefer, however, to divide the hollow body A (shown in Figs. 1 and 2) into a series of transverse compartments by means of the transverse partitions E, connected to the top, bottom, and sides of the hollow body, and each compartment has a pipe F leading thereto, said pipes uniting in a central pipe G, which is connected to the heat-collecting funnel H, adapted to be arranged over a lamp I or any other source of heat. Each pipe F is provided with a clamp K, comprising the members K', hinged at $K^2$ and having a screw-bolt $K^3$ passing through their free ends and by means of which the members L' can be contracted or expanded to close or open the pipe F. By means of a device constructed as herein shown and described I am enabled to supply heat directly to the entire body or any particular portion of the body, as it will be understood that by closing the cut-off clamps the air can be cut off from any particular compartment. Furthermore, by means of the cushions, such as shown in Fig. 4, heat can be applied to any particular part of the body irrespective of the construction of the mattress of said bed.

If desired, a hollow pillow I may be removably arranged upon the body A and heat conveyed into the pillow by means of a pipe F', which is connected to the central pipe G of the collecting-funnel, or, if desired, a separate funnel may be employed to collect the heat from any suitable source. The pipe F' is also provided with a valve, as shown, and in practice I also prefer to make the pillow-casing of stout fabric and hold the same open by means of a spiral spring M, that extends throughout the entire length of the said pillow-casing.

By arranging the pillow as described it may be readily placed upon or removed from the bed at will, and, if desired, it may be readily moved to the foot of the bed and used as a foot-warmer. A vent-opening is arranged in each of the compartments, as shown at X in the drawings.

Having thus fully described my invention, what I claim as new, and desire to secure by Letters Patent, is—

A device of the kind described, comprising a hollow body composed of air-tight fabric divided into a series of compartments, each compartment having a series of springs arranged therein, the angular supporting-arms connected to said hollow body, a heat-collecting funnel, a main pipe connected to said heat-collecting funnel, branch pipes extending from said main pipe and connected with the separate compartments of the hollow body, and the cut-off clamps arranged upon said branch pipes, substantially as shown and described.

PHILIP H. T. PAULINETTI.

Witnesses:
EDWARD P. MacLEAN,
GEORGE E. LIGHT.